UNITED STATES PATENT OFFICE 2,115,445

PRODUCTION OF COMPOUNDS OF THE AZABENZANTHRONE SERIES

Karl Koeberle and Otto Schlichting, Ludwigshafen-on-the-Rhine, Germany, assignors to General Aniline Works, Inc., New York, N. Y., a corporation of Delaware No Drawing. Application October 8, 1934, Serial No. 747,476. In Germany October 10, 1933

2 Claims. (Cl. 260—32)

The present invention relates to substitution products of azabenzanthrones and a process of producing same.

We have found that valuable substitution and condensation products of azabenzanthrones are obtained by causing aldehydes or substances supplying aldehydes to act in an aqueous alkaline vat on azabenzanthrones. Azabenzanthrones which are suitable as initial materials for the purpose of the present invention are for example Bz1- and Bz3-azabenzanthrones, corresponding to the formulae:

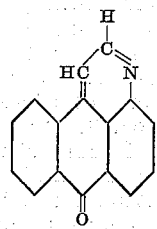
Bz1-azabenzanthrone

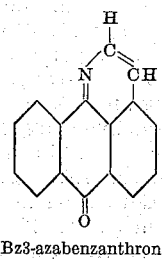
Bz3-azabenzanthrone their homologues and substitution products, as for example those containing halogen atoms or nitro, amino, hydroxy or acylamino groups. Besides, diazabenzanthrone corresponding to the formula:

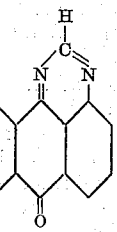

and its substitution products, as for example those containing the beforementioned substituents, or the compound corresponding to the formula:

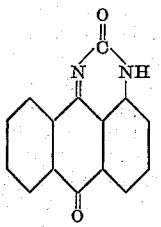 or 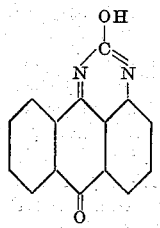

which may be named Bz1.Bz3-diaza-Bz2-hydroxybenzanthrone, may be employed as initial materials. Especially suitable are the nitro and amino derivatives of the said initial substances.

The aldehydes may belong to the aliphatic or aromatic series; aldehydes especially suitable are for example formaldehyde, which may also be used in the form of para-formaldehyde or the sodium salt of its sulfoxylate known under the registered trade-mark "Rongalit", the addition compounds of aldehydes with sodium or potassium bisulfite, furthermore benzaldehyde and its substitution products.

The reaction may be carried out by causing aldehydes or substances supplying aldehydes to act in aqueous solution or suspension at ordinary or moderately elevated temperatures, usually below 100° C., on the said azabenzanthrone derivatives, preferably in the form of their leuco compounds. A specially advantageous modification of the process according to this invention consists in introducing the aldehydes or the like into an alkaline hydrosulfite vat of the azabenzanthrone derivative while stirring. The reaction soon commences and in many cases leads to the deposition of a precipitate from the vat which was previously clear. When the reaction is completed, the precipitated reaction product is filtered off by suction. In cases when separation is not directly desired air is led through the reaction mixture or an oxidizing agent is added thereto. In many cases it may be necessary to heat the filtrate in order to separate the reaction product completely.

The reaction products are usually obtained in very good yields and constitute in part homologues of the initial materials, as for example when employing formaldehyde, methyl derivatives and when employing benzaldehyde, benzyl derivatives. In the case of many azabenzanthrone derivatives as for example with the amino-Bz1.Bz3-diazabenzanthrones, condensations to form compounds of higher molecular weight may sometimes take place.

The reaction products are in part dyestuffs and in part intermediate products for the preparation of dyestuffs. They may be purified by the usual methods, as for example by crystallization, sublimation or if they have a basic character by purification by way of their salts with strong acids, as for example sulfuric acid.

The following examples will further illustrate how the said invention may be carried out in practice but the invention is not restricted to these examples. The parts are by weight.

Example 1

9 parts of a 30 per cent aqueous solution of formaldehyde are added while stirring and leading in nitrogen to a vat prepared from 10 parts of finely divided Bz1.Bz3-diazabenzanthrone, 1000 parts of water, 44 parts of 48 per cent caustic soda solution and 24 parts of sodium hydrosulfite, the whole being allowed to remain for about 2 hours at 40° C., the small amount of precipitate being filtered off and air led through the filtrate. After filtration by suction and washing the precipitate about 10 parts of a brownish reaction product are obtained which after crystallization from chlorbenzene or glacial acetic acid are obtained in the form of brownish needles which melt at 217° C. The reaction product dissolves in concentrated sulfuric acid giving a yellow coloration and in organic solvents such as glacial acetic acid, chlorobenzene and nitrobenzene giving a yellow-red coloration. According to analysis it is a methyl derivative of Bz1.Bz3-diazabenzanthrone. By fusion with alcoholic potash a vat dyestuff is obtained which dyes cotton yellow shades from a red vat.

If 6 parts of benzaldehyde be employed instead of the formaldehyde and the whole be kept for about 2 hours at from 50° to 60° C., filtered, air led through the filtrate, the precipitate filtered off by suction and washed with water, a pale brown reaction product is obtained which, after crystallization from trichlorbenzene, for example, is obtained in the form of orange colored diamond-shaped leaflets having a melting point of 185° C. It is soluble in concentrated sulfuric acid giving a yellow coloration. According to analysis, it is a benzyl-Bz1.Bz3-diazabenzanthrone.

Example 2

10 parts of finely divided 5-amino-Bz1.Bz3-diazabenzanthrone are suspended in 1000 parts of water; while leading nitrogen over the suspension and stirring, 40 parts of 48 per cent aqueous caustic soda solution and 23 parts of solid sodium hydrosulfite are introduced. As soon as complete vatting has taken place, 9 parts of a 30 per cent aqueous formaldehyde solution are introduced and the whole is kept for about 2 hours at from 30° to 40° C. The deposited precipitate is filtered off by suction, washed until neutral and dried. Further amounts of the reaction product may be obtained from the filtrate by leading in air.

The reaction product is a red powder which may be purified by way of its sulfate. It forms red leaflets which melt at between 256° and 257° C.; it dissolves in concentrated sulfuric acid giving a yellow coloration which changes to green-blue upon the addition of formaldehyde. By dilution with water, the sulfuric acid solution yields a red-violet sulfate. Vegetable fibres are dyed powerful red shades from a red vat. According to analysis it is an amino-dimethyl-Bz1.Bz3-diazabenzanthrone (most probably 5-amino-2.6-dimethyl-Bz1.Bz3-diazabenzanthrone).

If instead of formaldehyde benzaldehyde or a toluyl aldehyde is employed, the corresponding 5-amino-Bz1.Bz3-diazabenzanthrones containing two aralkyl groups are obtained.

If 5-amino-Bz2-methyl-Bz1.Bz3-diazabenzanthrone be employed instead of 5-amino-Bz1.Bz3-diazabenzanthrone, a reaction product giving red dyeings is also obtained.

A similar compound is obtained if instead of 5-amino-Bz1.Bz3-diazabenzanthrone 5-amino-Bz2-phenyl-Bz1.Bz3-diazabenzanthrone is employed.

Example 3

6.4 parts of a 30 per cent aqueous formaldehyde solution are added to a vat prepared from 10 parts of 5-benzoyl-amino-Bz1.Bz3-diazabenzanthrone, 1000 parts of water, 30 parts of 48 per cent caustic soda solution and 15 parts of sodium hydrosulfite while stirring and passing nitrogen thereover. After stirring for from 2 to 3 hours at from 30° to 40° C., the whole is filtered off by suction, a brownish yellow powder being formed which may be obtained in the form of golden yellow needles having a melting point of from 260° to 262° C. by crystallization from trichlorbenzene. By leading air into the filtrate, further amounts of the reaction product are obtained. It dyes cotton yellow shades of good fastness from a red vat. By saponification with concentrated sulfuric acid, glistening red needles having a melting point of from 253° to 254° C. are obtained.

By employing the equivalent amount of 4-(para-chlorbenzoylamino)-Bz1.Bz3-diazabenzanthrone instead of 5-benzoylamino-Bz1.Bz3-diazabenzanthrone, a yellow dyestuff is obtained which melts at from 280° to 282° C. and which dyes cotton slightly more greenish yellow shades than the initial material.

Example 4

5 parts of 5-amino-Bz1-methyl-Bz2-oxo-Bz1.Bz3-diazabenzanthrone (which is known under the name 5-amino-N-methyl-1.9-anthrapyrimidone) are vatted with 500 parts of water, 18 parts of 48 per cent aqueous caustic soda solution and 10 parts of sodium hydrosulfite while excluding air. 12 parts of a 10 per cent solution of formaldehyde are added at from 30° to 40° C. to the vat while stirring and leading nitrogen thereover. After a short time a precipitate commences to separate; after stirring for 2 hours at from 30° to 40° C. the precipitate is filtered off by suction and washed with water. The reaction product obtained is a dark red powder which melts above 360° C. and dissolves in concentrated sulfuric acid giving a golden yellow coloration which changes to blue upon the addition of formaldehyde; by diluting the sulfuric acid solution with water, a violet-red precipitate is formed. Cotton is dyed bordeaux red shades from a red vat.

If 4-amino-Bz1-methyl-Bz2-oxo-Bz1.Bz3-diazabenzanthrone be treated with formaldehyde in the same manner, a dark red compound is obtained which dyes acetate silk rose shades.

In an analogous manner, Bz1-methyl-Bz2-oxo-Bz1-azabenzanthrone may be converted into 2-methyl-Bz1 - methyl-Bz2 - oxo-Bz1 - azabenzanthrone.

Example 5

100 parts of finely divided Bz3-azabenzanthrone are suspended in 1000 parts of water. To the suspension, there are added 450 parts of 50 per cent caustic soda solution and 240 parts of sodium hydrosulfite at from 65° to 70° C. nitrogen being passed over the liquid. Then, there are added 200 parts of a 20 per cent aqueous formaldehyde solution. The whole is then further heated for 3 hours at from 65° to 70° C. After cooling, the reaction product is filtered off by suction. Any residues remaining in the filtrate may be precipitated therefrom by leading in air. The resulting precipitate is also filtered off by suction and washed with water. The methyl-Bz3-azabenzanthrone thus obtained in an almost quantitative yield melts at 208° to 209° C. It forms pale yellow needles and dissolves in concentrated sulfuric acid giving a yellow coloration.

Example 6

50 parts of Bz2-methyl-Bz1-azabenzanthrone, corresponding to the formula:

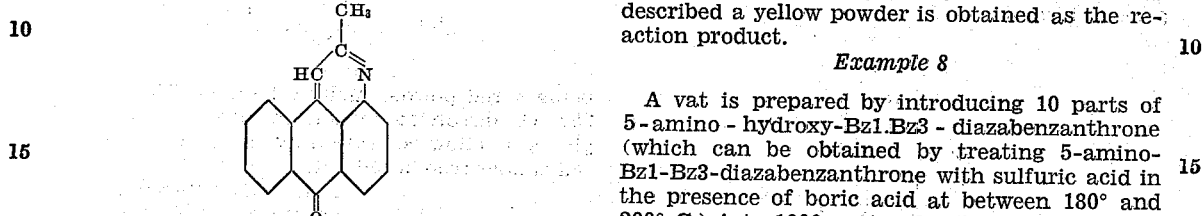

are vatted at 50° C. with 4000 parts of water, 220 parts of 48 per cent caustic soda solution and 120 parts of sodium hydrosulfite. 150 parts of 10 per cent formaldehyde solution are added in the course of half an hour while stirring and leading nitrogen thereover. The deposition of a crystalline precipitate commences even during the addition of the formaldehyde solution. After about 6 hours the resulting precipitate is filtered off by suction, washed until neutral and obtained in the form of yellowish needles having a melting point of from 245° to 246° C. by crystallization, as for example from glacial acetic acid. A further batch of the reaction product is obtained from the filtrate by leading in air and filtering the resulting precipitate by suction. When the filtrate thus obtained is acidified with hydrochloric acid, a further precipitate is obtained which differs from the first two precipitates.

Example 7

50 parts of 8-amino-Bz1.Bz3-diazabenzanthrone are introduced into a solution of 120 parts of sodium hydrosulfite in 4000 parts of a 2.5 per cent aqueous caustic soda solution. Then, 300 parts of an 8.5 per cent aqueous formaldehyde solution are added to the said vat at about 45° to 50° C. The whole is then stirred for about 2 hours, nitrogen being led in. After cooling, the reaction product is filtered off by suction. It is a red violet powder which may be purified by recrystallization from trichlorbenzene. It dissolves in concentrated sulfuric acid giving a yellow coloration which is substantially more intensive than that of the initial material in concentrated sulfuric acid. By adding formaldehyde to the solution of the new compound in sulfuric acid it assumes a blue green coloration whereas the solution of the initial compound in sulfuric acid assumes a blue coloration by adding formaldehyde. The reaction product dyes cotton powerful red violet shades from a yellow red vat whereas 8-amino-Bz1.Bz3-diazabenzanthrone dyes cotton weakly reddish shades.

A further amount of the reaction product can be obtained by leading in air into the filtrate above obtained and filtering off by suction the violet precipitate thus formed.

A compound of similar properties is obtained if nitro-Bz1.Bz3-diazabenzanthrone (which can be prepared by nitrating Bz1.Bz3-diazabenzanthrone with a mixture of concentrated nitric and concentrated sulfuric acid) is treated in the manner described.

If the mixture of 6-amino- and 7-amino-Bz1.Bz3-diazabenzanthrone (which can be obtained from the technical mixture of 1.6- and 1.7-diaminoanthraquinone by treating with formamide) is treated in the same manner a violet brown powder is obtained as the reaction product. It dyes cotton powerful violet brown shades from a red vat whereas the initial material dyes cotton weakly brown shades.

If 5-chlor-Bz1.Bz3-diazabenzanthrone is vatted and treated with formaldehyde in the manner described a yellow powder is obtained as the reaction product.

Example 8

A vat is prepared by introducing 10 parts of 5-amino-hydroxy-Bz1.Bz3-diazabenzanthrone (which can be obtained by treating 5-amino-Bz1-Bz3-diazabenzanthrone with sulfuric acid in the presence of boric acid at between 180° and 200° C.) into 1000 parts of a 2 per cent caustic soda solution containing 24 parts of sodium hydrosulfite. While leading in nitrogen, 100 parts of a 5 per cent aqueous solution of formaldehyde is added to the said vat at 45° to 50° C. The whole is kept at the said temperature for 2 hours without the access of air. After oxidation which is effected by leading in air the violet red solution is rendered weakly acid. The reaction product which is a violet powder is then filtered off by suction. It may be purified by recrystallization from trichlorbenzene or by way of its sulfate. It is thus obtained in the form of a violet brown crystalline powder which melts above 360° C. It dissolves in concentrated sulfuric acid giving a red violet coloration whereas the initial material dissolves in concentrated sulfuric acid giving a yellow red coloration. It dyes cotton brownish shades from a yellow red vat.

Example 9

35 parts of para-chlorbenzaldehyde are introduced, while stirring, at 50° C. into a vat prepared from 50 parts of Bz1.Bz3-diazabenzanthrone, 4000 parts of water, 220 parts of 48 per cent aqueous caustic soda solution and 120 parts of sodium hydrosulfite while leading in nitrogen. The mass is stirred at the said temperature for 3 hours. The precipitate formed is then filtered off by suction and air is led through the filtrate. The reaction product thus precipitated is filtered off by suction and washed with water. It is a yellowish powder which may be purified by recrystallization for example from glacial acetic acid. The pure product which according to analysis is a para-chlorbenzyl-Bz1.Bz3-diazabenzanthrone, forms brownish glittering crystals which melt at between 204° and 205° C. It dissolves in concentrated sulfuric acid giving a yellow coloration and in organic solvents giving an orange coloration. It yields an orange red vat.

If 22 parts of acetaldehyde are employed instead of para-chlorbenzaldehyde, ethyl-Bz1.Bz3-diazabenzanthrone is obtained which forms orange needles having a melting point of 180° C. Products of a similar constitution are obtained by employing other substituted benzaldehydes as for example the para-aldehyde of benzoic acid corresponding to the formula:

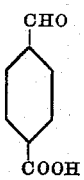

which has also the name terephthalic aldehyde carboxylic acid.

What we claim is:

1. A process of producing azabenzanthrones which comprises causing an aldehyde selected from the class consisting of aliphatic aldehydes and benzaldehyde to act in an aqueous alkaline vat on an azabenzanthrone corresponding to the general formula

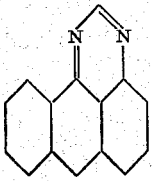

2. 5-amino - 2.6 - dimethyl-Bz1.Bz3-diazabenzanthrone corresponding to the formula

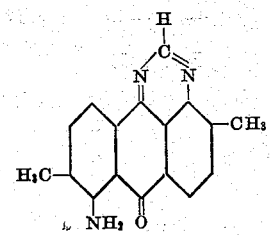

being a red powder melting between 256° C. and 257° C., dissolving in concentrated sulfuric acid giving a yellow coloration dyeing vegetable fibres red shades from a red vat.

KARL KOEBERLE.
OTTO SCHLICHTING.